United States Patent

Busch

[15] 3,649,823

[45] Mar. 14, 1972

[54] DIGITAL TRANSLATOR

[72] Inventor: Edward G. Busch, Newtown Square, Pa.

[73] Assignee: Adtrol Electronics, Inc., Broomall, Pa.

[22] Filed: Dec. 22, 1969

[21] Appl. No.: 886,930

[52] U.S. Cl. ....................235/155
[51] Int. Cl. ....................H04l 3/00
[58] Field of Search ....................235/155

[56] References Cited

UNITED STATES PATENTS

| | | | |
|---|---|---|---|
| 3,350,708 | 10/1967 | Adler | 235/155 |
| 3,160,740 | 12/1964 | Mann | 235/155 |
| 3,521,040 | 7/1970 | Frentress | 235/155 |
| 3,474,441 | 10/1969 | Schorum | 235/155 |

*Primary Examiner*—Daryl W. Cook
*Assistant Examiner*—Jeremiah Glassman
*Attorney*—Caesar, Rivise, Bernstein & Cohen

[57] ABSTRACT

A translator for converting a weighted binary-coded signal representative of a number into a decimal representation of the number. The translator includes means for receiving a binary-coded signal, a source of clock pulses and a replaceable unit having both gating means which is comprised of a plurality of coincidence gates and a counting means which is comprised of a plurality of decimal counters. Each of the counters corresponds to a digit of the decimal number generated by the translator. The unit further includes a plurality of conductive leads which are responsive to the binary signal and the clock pulses. The gates are connectable to the conductive leads in accordance with the decimal significance of each bit of the binary code so that the gating means enable the passage of clock pulses to the counter in accordance with the decimal significance of each bit of the binary signal which is present. The counter is stepped to the count corresponding to the number. Display means are provided which are responsive to the counter for visually displaying the number.

10 Claims, 5 Drawing Figures

INVENTOR
EDWARD G. BUSCH
BY
Caesar, Rivise, Bernstein & Cohen
ATTORNEYS.

INVENTOR
EDWARD G. BUSCH
BY
Caesar, Rivise, Bernstein & Cohen
ATTORNEYS.

INVENTOR
EDWARD G. BUSCH
BY
Caesar, Rivise, Bernstein & Cohen
ATTORNEYS.

INVENTOR
EDWARD G. BUSCH

BY
Caesar, Rivise,
Bernstein & Cohen
ATTORNEYS.

INVENTOR
EDWARD G. BUSCH
BY
Caesar, Rivise, Bernstein & Cohen
ATTORNEYS.

DIGITAL TRANSLATOR

SPECIFICATION

This invention relates generally to code converters and more particularly to a digital translator for converting a weighted binary-coded signal to a decimal representation of the number represented by said binary-coded signal.

There has been a need in the digital display field for a translator or code converter which is capable of providing a readout in usable form of the decimal representation of the number or scale that is produced by a series of binary signals. For example, a typical need is for a translator which can convert a 20-bit binary word which represents azimuth full scale to a readout in straight decimal or binary-coded decimal in the form of degrees (i.e., 360.00°). A digital translator of this nature which is capable of handling this function must be reasonably fast in order to provide substantially instantaneous readout yet which is not too expensive to be utilized in conjunction with the remainder of the equipment provided.

Code converters which attempt to convert from the binary-coded signal to a decimal signal by means of serial conversion are too slow for this purpose. On the other hand, parallel converters which convert in parallel the binary-coded signal to a decimal signal are too expensive to be warranted for the various applications where they are needed.

Another disadvantage of prior translators is that they are not adaptive to the various scales of binary-coded information which are used. That is, a translator which is capable of converting straight binary to decimal would be incapable without substantial alteration of converting a binary Gray code to decimal.

It is therefore an object of the invention to overcome the aforementioned disadvantages.

Another object of the invention is to provide a new and improved digital translator which will accept binary-coded data, each bit representing any degree of weight and scale factor and convert the entire input word to a decimal code with scale factor changes included in the new code.

Another object of the invention is to provide a new and improved digital translator wherein scale changes for converting different types of binary-coded signals to decimal representations are accomplished by substitution of a replaceable gating and counting unit.

Still another object of the invention is to provide a new and improved digital translator which combines serial and parallel conversion to provide an inexpensive yet fast converter.

Yet another object of the invention is to provide a new and improved digital translator which utilizes timing and gating circuitry which adapts the system for changes of weight and scale by the replacement of a gating and counting unit.

These and other objects of the invention are achieved by providing a translator for converting a binary-coded signal representative of a number into a decimal representation of the number. The translator includes means for receiving the binary-coded signal, a source of clock pulses and a replaceable unit. The replaceable unit includes a plurality of coincidence gates and a plurality of decimal counters. Each of the counters corresponds to a digit of the decimal number generated by the translator. The unit further includes a plurality of conductive leads responsive to the binary signal and the clock pulses. The gates are connectable to the conductive leads in accordance with the decimal significance of each bit of the binary code so that the gating means enables the passage of clock pulses to the counter in accordance with the decimal significance of each bit of the binary signal which is present. The counter is stepped to the count corresponding to the number. Display means are provided responsive to the counter for visually displaying the number.

Other objects and many of the attendant advantages of this invention will be readily appreciated as the same becomes better understood by reference to the following detailed description when considered in connection with the accompanying drawings wherein.

Referring now in greater detail to the various figures in the drawing wherein similar reference numerals refer to similar parts, a digital translator embodying the invention is shown generally in block diagram form in FIG. 1.

Figure 1:
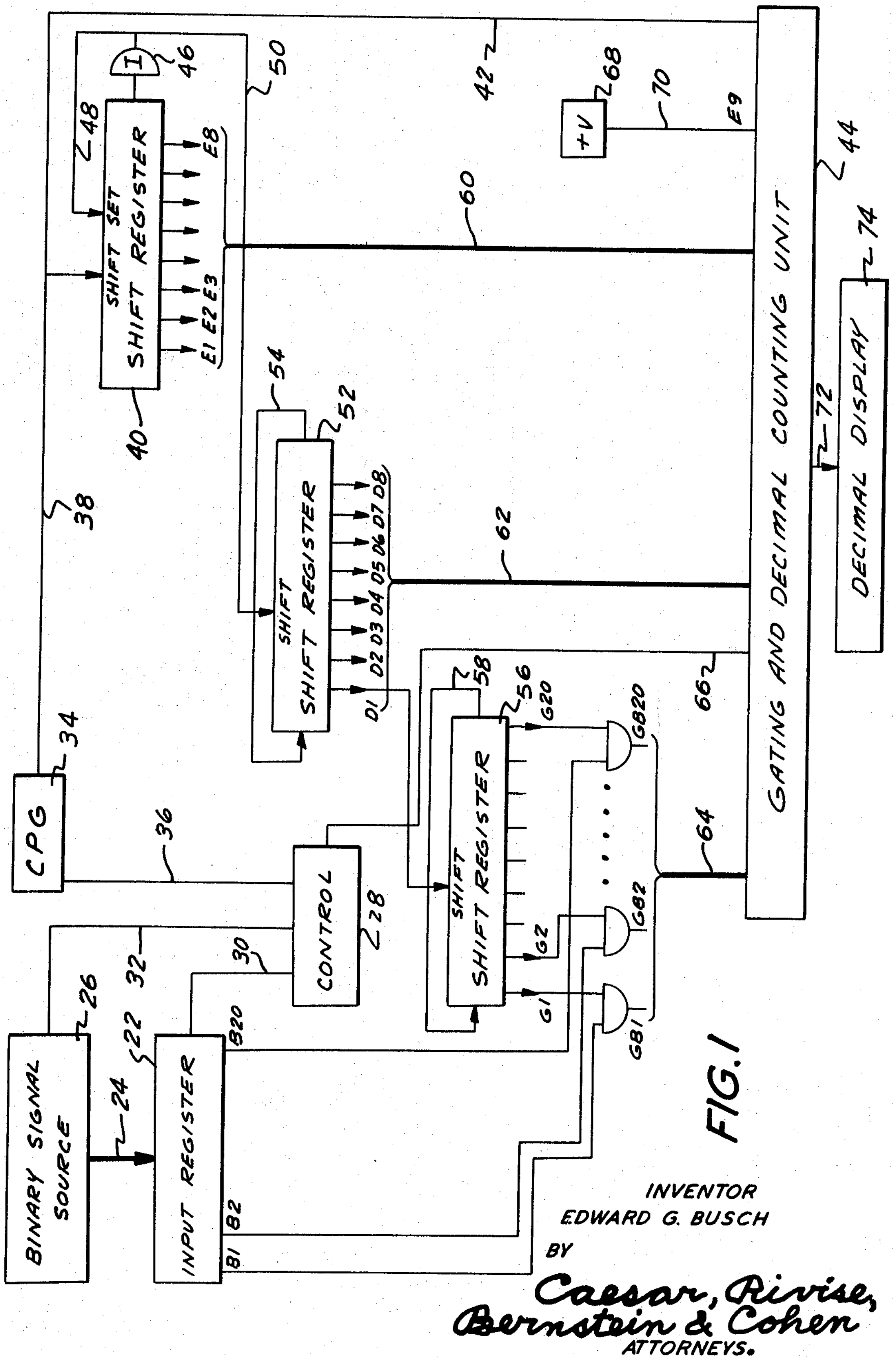
FIG. 1 is a schematic block diagram of a digital translator embodying the invention.

The digital translator basically comprises an input register 22 which receives input signals via input lines 24 from a binary signal source 26. A control unit 28 is provided for controlling the flow of data throughout the system as well as to terminate and initiate translating commands. The control unit is connected to the input register via line 30 and to the binary signal source via line 32. The control unit provides signals on lines 30 and 32 for the transference of the binary signals from source 26 to the input register 22 to interrogate and initiate translation of the signals provided by the binary signal source to the translator.

The translator further includes a clock pulse generator (CPG) 34 which is initiated by the control unit 28 via line 36. The clock pulse generator 34 is connected via line 38 to a shift register 40 and via line 42 to a gating and decimal counting unit 44. Shift register 40 is an eight-stage shift register which effectively acts as a modulo 9 counter.

The shift register 40 includes a plurality of output lines E1 through E8 which are the outputs respectively of the first through eighth stages of the shift register. Line 38 is connected to the shift input of shift register 40. A set input to the shift register is also provided which is connected to the output of the eighth stage of the shift register via an inverter 46 and line 48. The inverter is also connected via output line 50 to the shift input of an eight-stage shift register 52.

Shift register 40 is so connected that each time a 0 is shifted into the eighth stage of the shift register, inverter 46 causes a positive signal to be provided on line 48 to the set input of the shift register. The next shift pulse thus causes a 1 to be provided in each stage of the shift register. Accordingly, since the set input of the shift register 40 then has an effective 0 provided via line 48 to the set input, the next shift pulse merely causes the eight 1's to be shifted to the right thereby causing the first stage to include a 0 and the next seven stages to include a 1. The next seven successive shift pulses thereby cause the 1's to be shifted to the right of the shift register 40 and out the eighth stage. When the eighth stage of the shift register is again at 0, the line 48 again goes to a state indicative of a 1 as a result of the inverter 46 inverting the 0 in the eighth stage to a 1 and thereby causing the next pulse to cause a 1 to be placed in each bit of the register again. The process is, of course, iterative and each complete cycle requires nine pulses.

Shift register 52 is shifted each time the invertor 46 provides via line 50 a positive signal as a result of the inversion of a 0 in the eight stage of shift register 40. Shift register 52 is thus shifted one position each time shift register 40 is completely recycled. The shift register 52 has a single 1 bit which is shifted from the first through the eighth stages and is then shifted out of the eighth stage via line 54 to the first stage of the shift register. The shift register 52 thus recirculates the 1 bit.

Each of the stages of the shift register includes an output line which are labeled D1 through D8. The line D1 is also connected to the shift input of a 20-stage shift register 56. Shift register 56 is similar to shift register 52 with the difference that shift register 56 includes 20 stages which have a single 1 bit circulating therethrough which is shifted through the shift register and returned to the first stage of the shift register via line 58 which is connected from the output of the 20th stage to the input of the first stage. Output lines are provided from each of the stages 1 through 20 of the shift register and are labeled G1 through G20, respectively, in FIG. 1. The gating and decimal counting unit 44 is responsive to each of the stages of shift registers 40, 52 and 56. The output lines E1 through E8 of shift register 40 are connected via lines 60 to the gating and decimal counting unit as indicated by the bracket below lines E1 through E8. Similarly, the output lines D1 through D8 of shift register 52 are connected via lines 62 to the decimal and counting unit 44.

The output lines G1 through G20 are each connected to an input line of a coincidence gate GB1 through GB20, respectively. Each of the gates GB1 through GB20 is also connected to an output line of the input register 22. Input register 22 is a 20-bit binary register which includes 20 output lines, each of which is connected to one of the stages thereof and is labeled B1 through B20, respectively, in FIG. 1. Thus, gate GB1 is connected to the output line B1 of input register 22 and line G1 of shift register 56. Gate GB2 is connected to output line B2 of input register 22 and G2 of shift register 56 and so on through gate GB20 which is connected to output line B20 of input register 22 and output line G20 of shift register 56. The output lines of gates GB1 through GB20 are each connected via lines 64 to the gating and decimal counting unit 44.

The gating and decimal counting unit is also connected to control unit 28 via line 66 and to a positive source of voltage (+V) 68 via line 70. The positive source of voltage 68 provides an output signal which is equal to the voltage of the positive signals produced on lines E1 through E8 when a 1 bit is provided in the associated stage of shift register 40. The signal on line 70 is constant and, as will hereinafter be seen, provides a signal which is used as E9.

The gating and decimal counting unit 44 is connected via output lines 72 to a decimal display 74 which is preferably comprised of nixie tubes for displaying the contents of the counting units which are provided in the gating and decimal counting unit 44. The gating and decimal counting unit 44 is removable and replaceable with a gating and decimal counting unit of a similar type and size. That is, the gating and decimal counting unit 44 is preferably provided on a printed circuit board which is pluggable into the system shown in FIG. 1. The input lines 42, 60, 62, 64, 66, 70 and output line 72 to and from the gating and decimal counting unit 44 are terminated in detachable connectors for quick replacement.

Figure 2A:
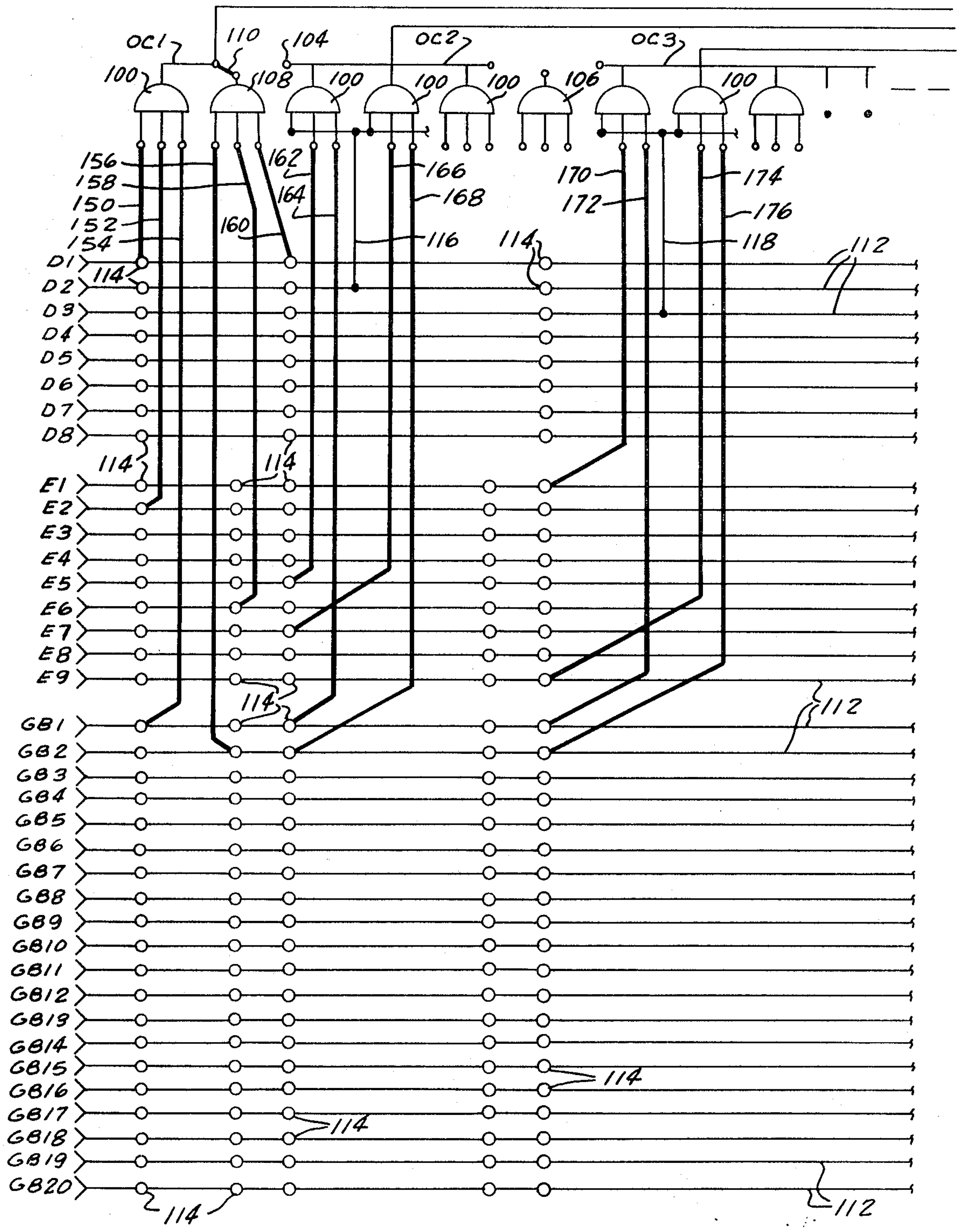
FIGS. 2A and 2B is a diagrammatic representation of the wiring diagram of a gating and decimal counting unit which is utilized to convert a specific binary code to a decimal output.
Figure 2B:
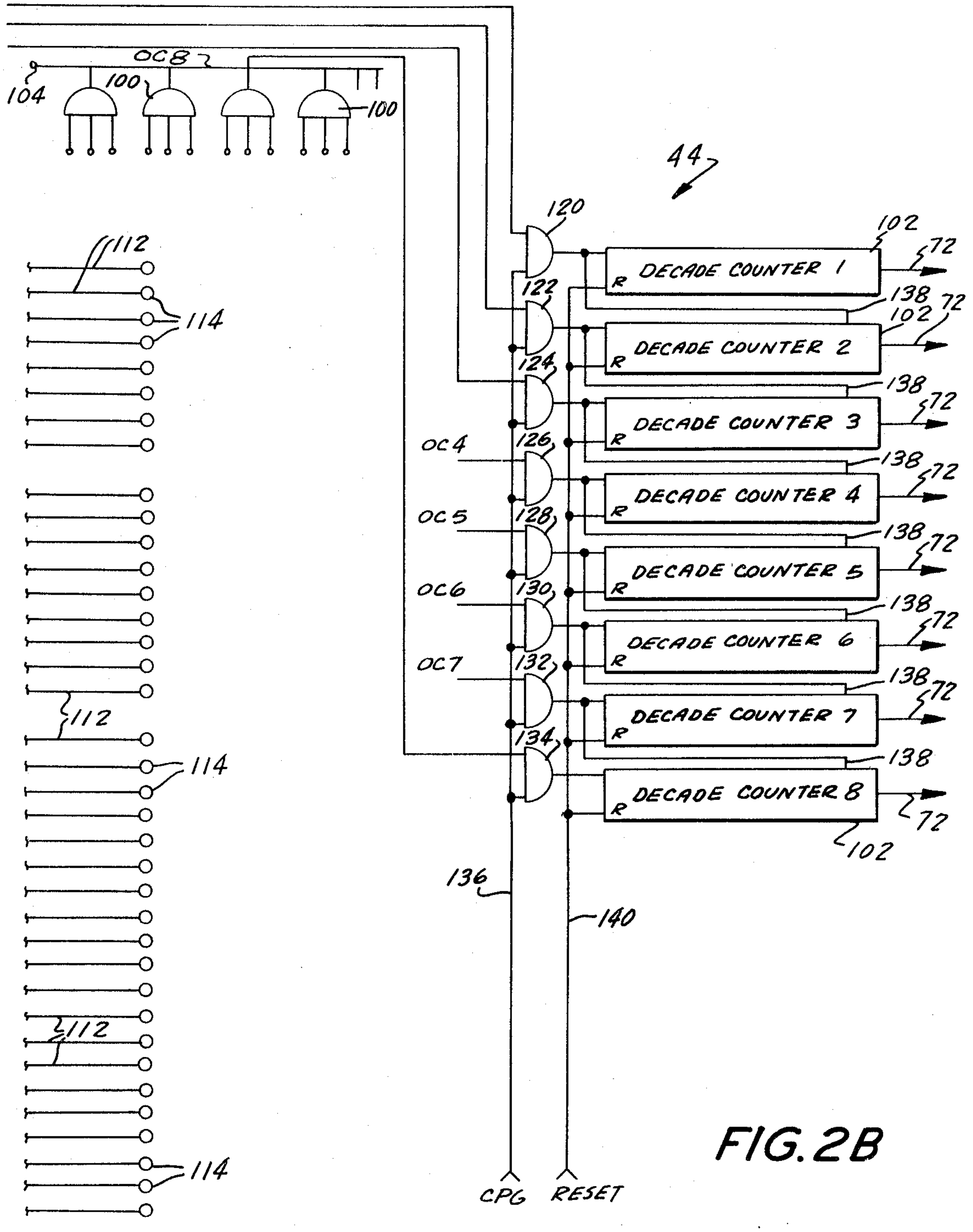

The gating and decimal counting unit 44 is best seen in FIG. 2, which is comprised of FIGS. 2A and 2B. Unit 44 basically comprises a plurality of coincidence gates 100 and a plurality of decade counters 102. The coincidence gates 100 are provided adjacent and are grouped and connected to a plurality of conductors OC1, OC2 and OC3 through OC8. Common output conductors OC1 through OC8 are each connected with a different one of the decade counters 102 which are respectively labeled decade counter 1 through decade counter 8. In FIG. 2, only the gates associated with OC1, OC2, OC3 and OC8 have been illustrated for purposes of clarity. However, it should be understood that a larger number of gates 100 is connected to each of the output conductor lines OC1 through OC8 and the number is substantially dependent on the various scale factors with which it is expected that the unit 44 can be used. However, in a preferred embodiment, approximately seven gates are provided which are directly connected to output conductors OC2 through OC8 with approximately three or four extra gates 100 provided which can be connected to either one or the other of the output conductors. That is, each of the output conductor lines OC1 through OC8 are connected to terminals 104 which are provided adjacent gates such as gate 106 of gates 100 which can be connected by a conductive strap to either line OC2 or OC3. For example, gate 108 is shown connected via an electrical strap 110 to output conductor line OC1. Strap 110 is indicated by a bold line and is not provided initially on the printed circuit board which comprises the unit 44.

Each of the conductive straps which are illustrated in bold line as shown in FIG. 2 is provided to illustrate an example hereinafter described in this application. However, it should be understood that the straps indicated by the bolder lines are added to the printed circuit board and adapt the printed circuit board for the various translation factors necessary to convert a weighted binary-coded signal to a decimal representation thereof.

The unit 44 includes, in addition to the gates 100 and decade counters 102, a plurality of conductive leads 112. Each conductive lead extends along the length of the printed circuit board parallel to the row of coincidence gates 100. Each conductive lead extends along the length of the printed circuit board parallel to the row of coincidence gates 100. Each of the conductive leads 112 includes a plurality of terminals 114 which enable the connection via conductive straps from the various conductive leads to the gates 100, which enable the adaptation of unit 44 and the translator to a specific scale factor. For ease of reference, conductive leads 112 are labeled in accordance with the lead in FIG. 1 which is connected thereto. For example, the top eight conductive leads 112 are labeled D1 through D8, respectively, and are connected, respectively, to output lines D1 through D8 of shift register 52 via lines 62. Similarly, the next nine conductive leads 112 are labeled E1 through E8 and are connected to lines E1 through E8 of shift register 40 via lines 60 and to the positive source of voltage 68 via line 70. Finally, the next 20 conductive leads 112 are connected to the output of gates GB1 through GB20 via lines 64 and are labeled GB1 through GB20, respectively. It should be noted that lead D2 of conductive leads 112 is connected to a first input of three gates 100 associated with output conductor OC2 via line 116. Similarly, conductive lead D3 is connected to three gates 100 which are connected to output conductor OC3 via line 118. Lines 116 and 118 are also provided initially with the printed circuit board in unit 44 since the D2 lead and D3 lead are always associated with output conductors OC2 and OC3 and decade counters 2 and 3. Accordingly, because the gates to which lines 116 and 118 are connected are always associated with these decades, such connections can be made initially.

Output conductor leads OC1 through OC8 are respectively connected to a first input of a plurality of gates 120, 122, 124, 126, 128, 130, 132 and 134. Gates 120 through 134 are coincidence gates which have their second input connected in common via line 136 to line CPG which is connected via line 42 to the clock pulse generator 34. The output of the coincidence gates 120 through 134 are each connected to the stepping input of the decade counter 1 through decade counter 8, respectively. Each of the decade counters 1 through 8 are connected to each other via carry lines 138 which provide a stepping pulse to the decade counter of the next higher significance upon recycling of the counter from a count of 9 to 0. Of course, decade counter 1 does not have such a carry line because it is the counter corresponding to the most significant digit. Decade counter 1 thus represents the most significant digit of the decimal representation generated by the translator and decade counters 2 through 8 represent the second through eighth most significant digits of the decimal representation of the converted binary signal. The decade counters are connected via output line 72, as hereinbefore set forth, to a decimal display 64 which displays the contents of the decade counters. A reset line 140 which is connected to control 28 via line 66 in FIG. 1 is connected to the reset input of each of the decade counters 102 to reset the count to 0 prior to translating of the next-sampled binary signal provided from the binary signal source 26 to the input register 22.

Figure 3A:
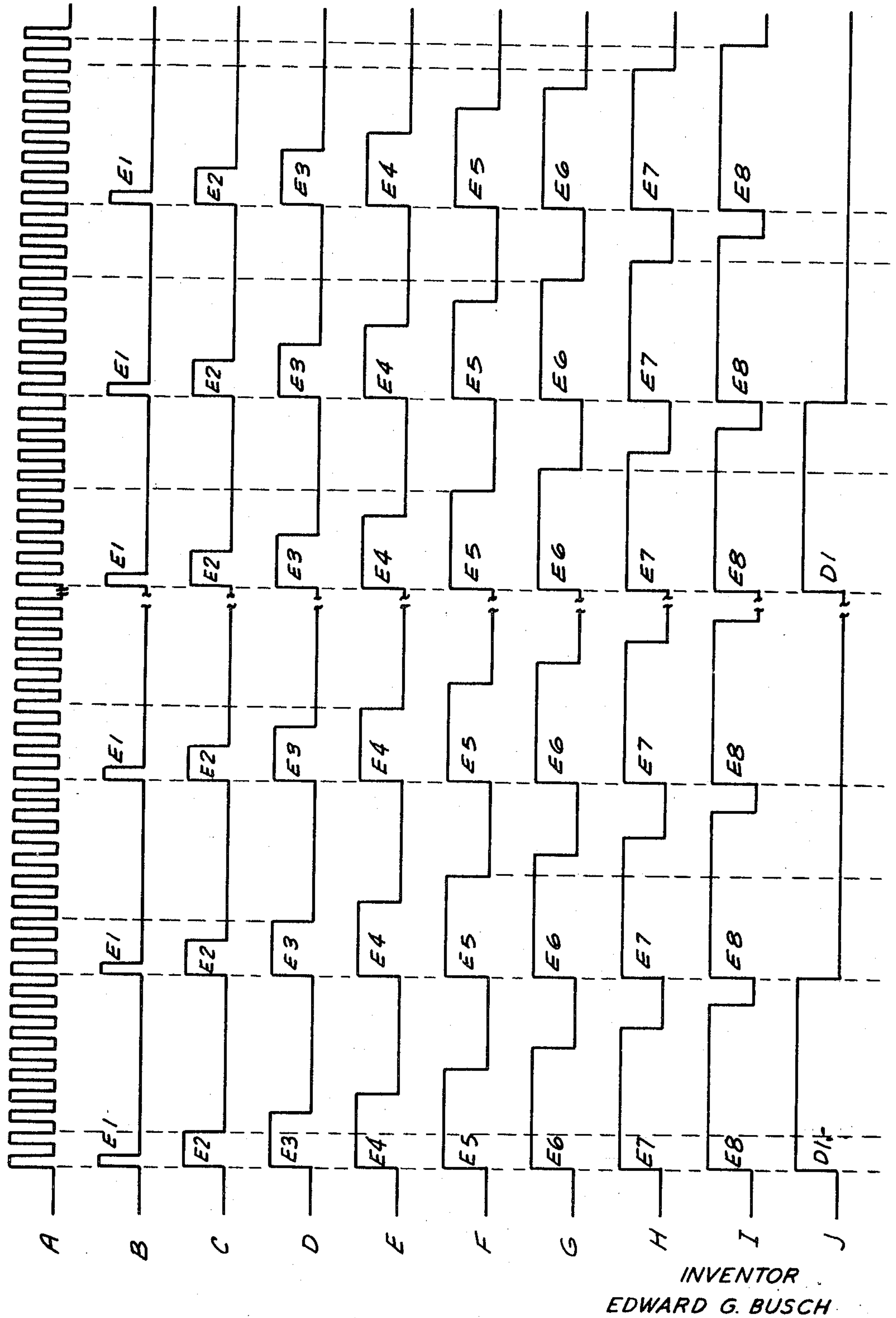
FIG. 3A and 3B is a diagrammatic representation of the waveforms of the signals generated throughout the system.
Figure 3B:
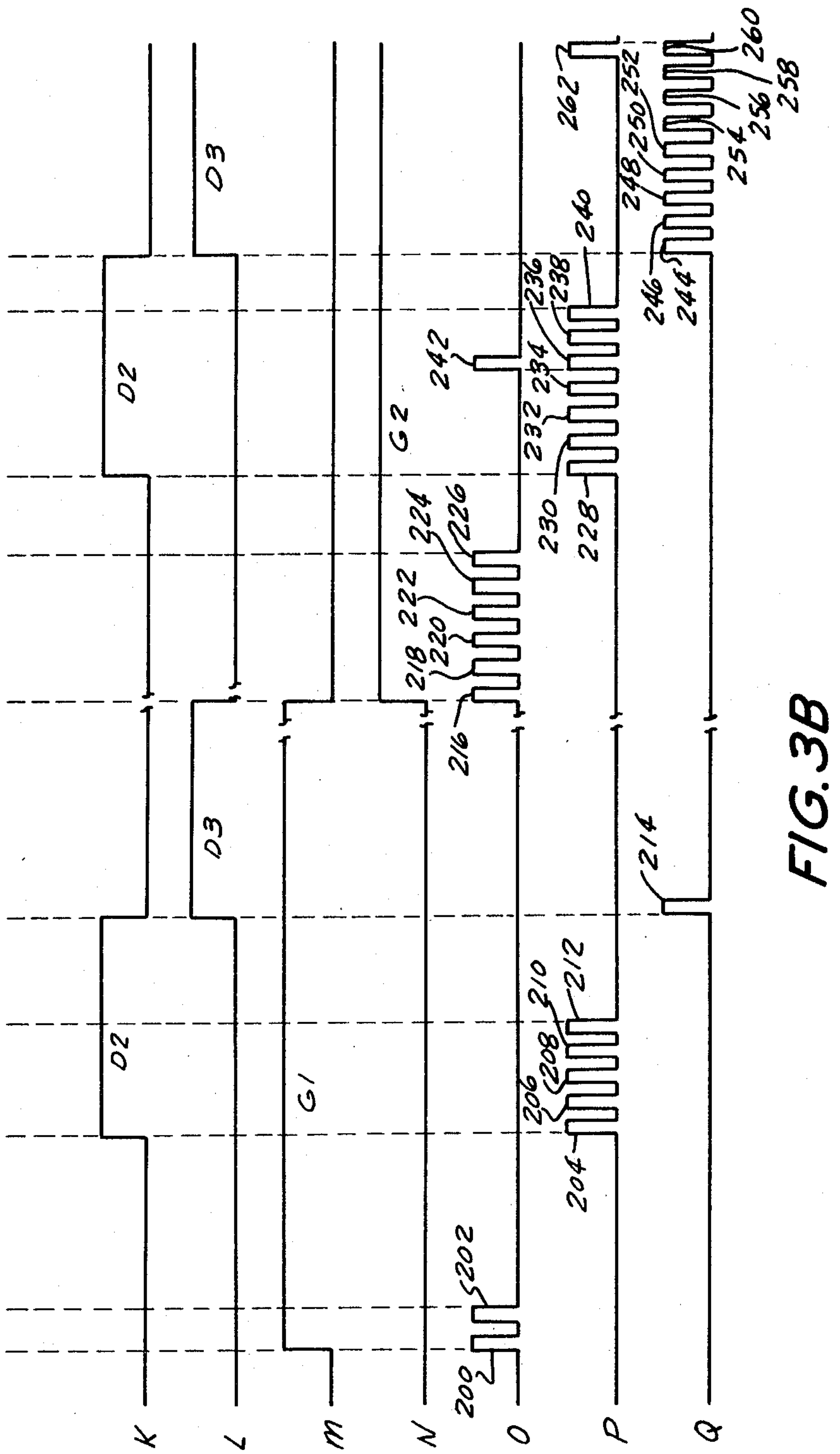

The operation of the translator is best understood in connection with the timing diagram shown in FIG. 3 which is comprised of FIGS. 3A and 3B. Lines A through Q diagrammatically illustrate the various signals which are generated throughout the circuitry and which illustrate the operation of the translator. Line A shows the signals provided on line 38 from the clock pulse generator 34 which are the basic clock pulses upon which each of the clock pulse signals in the circuitry are related. Line B illustrates the output signal on line E1 of shift register 40. The waveform E1 illustrates the length of time during which an enabling signal is provided on line E1. As seen therein, the line E1 is positive only for the length of the first clock pulse. It can therefore be seen that shift register 40 effectively generates an output signal in the first stage which is high during the first ninth of each cycle and is less positive during the remaining eight-ninths of the cycle.

Line C of FIG. 3 represents the output pulse provided on output line E2 of shift register 40. The output signal on line E2 thus provides an enabling signal during two-ninths of the cycle. Similarly, lines D, E, F, G, H and I represent the signals generated on output lines E3 through E8 of shift register 40. Line E3 is thus enabled during three-ninths of the cycle, line E4 is enabled during four-ninths of the cycle and so on through line E8 which is enabled during eight-ninths of the cycle. Line E9, which is generated via a positive source of voltage 68 on line 70, remains constant and is thus enabled a full cycle of nine pulses. Therefore, the shift register 40 need only include eight stages since the enabling signals for the E9 line are provided by a positive source of voltage and the condition where there is no enabling signal for a part of the cycle does not require a stage at all. By utilizing shift register 40, the number of clock pulses required to enable an entire translating operation is reduced by at least 10 percent since a full 10 pulses are not required for each decade, but rather only nine clock pulses.

Line J of FIG. 3 represents the signal generated on lead D1 of shift register 52. It can therefore be seen that during the first cycle of shift register 40, D1 is positive for the entire cycle and is less positive during the remaining seven cycles of the shift register 52. Upon the initiation of the ninth cycle of shift register 40, lead D1 of shift register 52 again goes more positive for a complete cycle. Line K represents the signal on output lead D2 which goes more positive only during the second cycle of every eight cycles of shift register 40. Similarly, line L of FIG. 3 represents the output signal on lead D3 which goes more positive only during the third of each eight cycles of shift register 40. Output lines D4 through D8 similarly produce output signals which go more positive during the fourth through eighth cycles of each eight cycles of shift register 40. Line M illustrates the output signal on line G1 of shift register 56. As can be seen on line M, output line G1 is at an enabling level during the first complete cycle of shift register 40. During the next 19 cycles of shift register 52, the output signal on line G1 is less positive as the 1 in shift register 56 shifts through the remaining stages. Line N of FIG. 3 represents the output signal on line G2 of shift register 56 which is at an enabling level during the second complete cycle of shift register 52. The output signal on line G2 remains less positive during the first and third through 20th cycles of each 20 cycles of shift register 52. Each of the remaining lines G3 through G20 is also enabled for one cycle of the third through 20th cycles, respectively, of the shift register 52.

The clock pulse signals produced by clock pulse generator 34 and the enabling signals provided by shift registers 40, 52 and 56 enable the generation of pulses for stepping the decade counters 102 of unit 44 in accordance with the numerical significance of each binary digit provided by the binary signal source 26.

In order to facilitate an understanding of the operation of this invention, it should be understood that each bit of a binary code has a specific decimal significance. Thus, for example, in a straight binary code of eight digits, the eighth or least significant digit has a decimal significance of 1. The seventh or next to the least significant digit has a decimal significance of 2. The sixth bit has a decimal significance of 4. The fifth bit has a decimal significance of 8. The fourth bit has a decimal significance of 16. The third most significant bit has a decimal significance of 32. The second most significant bit has a decimal significance of 64 and the most significant bit has a decimal significance of 128. Thus, assuming that an eight-bit binary signal consisted of all 1's, the manner in which, according to the invention, this bit would be converted is as follows:

The translation of the binary number 11111111 into its decimal equivalent is best seen in connection with the chart hereinbelow:

| Binary bit | Decimal significance Hundreds | Tens | Units |
|---|---|---|---|
| 1 (Most Significant) | 1 | 2 | 8 |
| 2 | 0 | 6 | 4 |
| 3 | 0 | 3 | 2 |
| 4 | 0 | 1 | 6 |
| 5 | 0 | 0 | 8 |
| 6 | 0 | 0 | 4 |
| 7 | 0 | 0 | 2 |
| 8 (Least Significant | 0 | 0 | 1 |
| Binary 11111111 = Decimal total | 2 | 5 | 5 |

As seen in the above chart, binary bits 1 through 8 and their decimal significance are listed on the left and right, respectively, of the chart. Under the decimal significance, each of the decimal significances of the binary bits are broken down into their hundreds, tens and units and units significance and are listed accordingly under the appropriate column.

In order to obtain the decimal equivalent of the binary number 11111111 it is then necessary only to add the decimal representation of the significance of each of the binary bits. Accordingly, each of the unit significances are added in the units column, then the tens column is added and then the hundreds column is added with carries from the next less significant digits being carried into the higher column. Thus, binary 11111111 equals decimal 255. Similarly, a binary number which includes 0's as well as 1's is converted to a decimal in the same manner. For example, to convert the binary number 10010011 to decimal, the translation is done as shown in the following chart:

| | Hundreds | Tens | Units |
|---|---|---|---|
| | 1 | 2 | 8 |
| | 0 | 1 | 6 |
| Binary 10010011 = | 0 | 0 | 2 |
| | 0 | 0 | 1 |
| | 1 | 5 | 7 |

Thus, as seen above, binary 10010011 equals decimal 157. Just as in the straight binary code each bit has a specific decimal significance, any binary code must attribute a specific significance to each bit of the code. Accordingly, even if each bit has an arbitrary and unrelated decimal significance, the binary code may still be translated in the same manner as the straight binary code. For example, the following truth table is for an arbitrary binary code which, for ease of reference, is limited to a two-bit binary number:

Truth Table

| Binary bit | Decimal significance Hundreds | Tens | Units |
|---|---|---|---|
| 1 | 2 | 5 | 1 |
| 2 | 6 | 7 | 9 |

Binary-Coded 11 = Decimal 930
Binary-Coded 10 = Decimal 251
Binary-Coded 01 = Decimal 679
Binary-Coded 00 = Decimal 000

In this example, the first bit is equal to a decimal significance of 251 and the second bit is equivalent to a decimal significance of 679. Thus, as indicated in the chart, binary-coded 11 equals decimal 930, binary-coded 10 equals decimal 251, binary coded 01 equals decimal 679 and binary-coded 00 equals decimal 000. In order to adapt the digital translator shown in FIG. 1 to translate the two-bit binary code set forth in the above truth table, unit 44 has added thereto the electrically conductive straps 110, 150, 152, 154, 156, 158, 160, 162, 164, 166, 168, 170, 172, 174 and 176. As will hereinafter be seen, the connection of the conductive leads 112 to various ones of the gates 100 enables a predetermined number of clock pulses to ge gated to the various decade counters, each of which is associated with a significant digit of the decimal representation of the binary-coded number. That is, decade counter 1, decade counter 2 and decade counter 3 correspond to the hundreds, tens and units digits of the decimal representation of the binary coded signal. Accordingly, the straps are connected to the various gates 100 for the following purposes: straps 150, 152 and 154 are connected at one end to the three inputs of a first gate 100 which is connected to the output conductor lead OC1; strap 150 is connected at its other end to conductive lead D1; strap 152 is connected at its other end to conductive lead E2; and, strap 154 is connected at its other end to conductive lead GB1. Conductive lead OC1 thus receives an enabling signal each time leads D1, E1 and GB1 are at an enabling potential. Accordingly, conductive lead OC1 enables gate 120 to pass clock pulses on line 136 to decade counter 1 each time gate 100 connected to straps 150, 152 and 154 is enabled. Straps 156, 158 and 160 are connected at one end to the gate 108 of gates 100. As set forth above, gate 108 is not initially connected to either of the output conductor leads OC1 or OC2 and thus strap 110 is required in order to connect the output of gate 108 to the terminal at the end of conductor lead OC1. The other ends of straps 156, 158 and 160 are connected to conductive leads D1, E6 and GB2, respectively. Straps 150, 152, 154, 156, 158 and 160 thus provide enabling signals for gate 120 in order to pass clock pulses to decade counter 1 each time the first or second bit of the binary word in the input register is a 1.

Straps 162 and 164 are connected at one end to a first gate connected to output conductor OC2. Straps 162 and 164 are connected at their other ends, respectively, to conductive leads E5 and GB1. The third input of the gate is connected via line 116 to conductive lead D2. The straps 166 and 168 are connected to a second gate associated with and connected to output conductor lead OC2. The opposite ends of the straps 166 and 168 are connected, respectively, to conductive leads E7 and GB2. The third input to the gate is also connected via line 116 to conductive lead D2. Straps 162, 164, 166 and 168 adapt the circuitry to enable gates 100 associated with output conductor lead OC2 to enable gates 122 associated with decade counter 2 to pass clock pulses to the decade counter 2 each time that either of bits B1 or B2 is a 1.

Straps 170 and 172 are connected to the input lines of a first gate associated with output conductor lead OC3. The opposite ends of straps 170 and 172 are connected to conductive leads E1 and GB1. The third input line of the gate is connected to conductive lead D3 via line 118. Straps 174 and 176 are connected to two of the inputs to a second gate 100 connected to output conductor OC3. The opposite ends of straps 174 and 176 are connected respectively to conductive leads E9 and GB2. The third input line to the gate is connected via line 118 to conductive lead D3. Straps 170, 172, 174 and 176 thus enable the gates associated with OC3 to provide enabling signals to gate 124 for passing clock pulses to the decade counter 3 each time either of the bits B1 or B2 is a 1.

The operation of the translator is best understood in connection with FIG. 3. Line O of FIG. 3 illustrates diagrammatically the pulse train which is fed to the stepping input to decade counter 1. Line P of FIG. 3 diagrammatically illustrates the pulse train which is fed to the stepping input of decade counter 2 and line Q of FIG. 3 diagrammatically illustrates the pulse train fed to the stepping input of decade counter 3 when bits B1 and B2 in the input register are both 1 and the unit 44 has been wired as shown in FIG. 2.

As best seen in FIG. 3, during the first cycle of shift register 40, two pulses 200 and 202 are fed to decade counter 1. Pulses 200 and 202 are gated to the decade counter because leads E2, D1 and GB1 are simultaneously enabled long enough to pass two clock pulses.

That is, the enabling signals from shift register 40 on leads E1 through E8 are respectively enabled for a long enough time to pass one through eight pulses in accordance with the specific line that it utilized. The shift register 52 provides signals on leads D1 through D8 which are utilized to sequentially enable the passage of pulses to decade counter 1, then decade counter 2 and so on until such time as lead D8 is enabled and thereby enables the passage of pulses to decade counter 8.

Shift register 56, on the other hand, selectively samples in sequential order the bits in the input register 22. The lines G1 through G20 which are sequentially enabled thus act to pass the binary information from lines B1 through B20 of the input register 22 to line 64 in sequential order. Accordingly, during the time that G1 is enabled, bit 1 is sampled and is thus utilized for translating the binary-coded signal into a decimal representation thereof. Similarly, during the time that G2 through G20 are enabled, the gates GB2 through GB20, respectively, are enabled to sample the state of lines B2 through B20.

Accordingly, during the first cycle of shift register 40, both D1 and G1 of shift registers 52 and 56 are enabled thereby causing an enabling signal on lead D1 and line GB1 which is coincidentally applied by straps 150 and 154 with the enabling signal of line E2 via strap 152 to the gate 100. E2 thus enables the passage of two pulses via gate 120 to the decade counter 1 and thereby steps the count of 2 into decade counter 1.

During the second cycle of the shift register 40, lead D2 of shift register 52 is enabled and line G1 of shift register 56 remains enabled to sample the first bit of the input register 22. Accordingly, as best seen on line P of FIG. 3, five pulses 204, 206, 208, 210 and 212 are applied to decade counter 2 via gate 122. That is, the gate which is connected to E5, GB1 and D2 is enabled by the simultaneous enabling signals on each of these lines and thereby causes gate 122 to be enabled to pass five clock pulses from line 136 to the decade counter 2.

During the third cycle of the shift register 40, lead D3 of shift register 52 is enabled while line G1 of shift register 56 remains enabled. Thus, the first bit remains sampled. Accordingly, as indicated on line Q of FIG. 3, a clock pulse 214 is fed to decade counter 3. Pulse 214 is fed to decade counter 3 via gate 124. The gate 124 is enabled by the gate which is connected via straps 170 and 172 to lines E1, GB1 and line 118 which is connected to lead D3. Since the enabling signal E1 is long enough only to pass one clock pulse via line 136, the gate 124 passes only a single clock pulse to the decade counter 3.

It can therefore be seen that during the first three cycles of shift register 40, the first bit B1 of input register 22 is sampled for the purpose of providing in the decade counters 1, 2 and 3 the number of pulses based on the decimal significance of the first bit of the binary code. Since the bit B1 is a 1, two pulses were provided in decade counter 1, five pulses were provided in decade counter 2 and one pulse was provided in decade counter 3 thereby providing the intermediate count of 251 in decade counters 1, 2 and 3. During the next five cycles of the shift register 40, no further pulses are provided to any of the decade counters 1, 2 or 3 since only three decades are utilized in connection with the two-bit binary code which is being translated.

During the ninth cycle of the shift register 40, the lead D1 of shift register 52 is again enabled and line G2 of shift register 56 is then enabled for the first time.

Accordingly, bit B2 is sampled during the next eight cycles of shift register 40. As best seen in line O of FIG. 3, six pulses are fed to decade counter 1 during the ninth cycle of shift register 40. The six pulses 216 through 226 are fed via gate 120 to decade counter 1. Gate 120 is enabled by the gate 100 connected to conductor lead OC1 which is connected via straps 156, 158 and 160 to conductor leads GB2, E6 and D1.

During the 10th cycle of shift register 40, the lead D2 of shift register 52 is enabled and line G2 of shift register 56 remains enabled. Accordingly, as best seen in FIG. 3 on line P, seven pulses 228, 230, 232, 234, 236, 238 and 240 are provided to decade counter 2 via gate 122. Gate 122 is enabled by the gate connected to OC2, the inputs of which are connected via straps 166 and 168 to leads E7 and GB2, respectively. It should also be noted that when pulse 236 is fed to decade counter 2, the counter changes from a count of 9 to a count of 0. Accordingly, a carry is fed via line 138 to decade counter 1. This pulse is seen on line O in FIG. 3 as pulse 242. During the 11th cycle of shift register 40, lead D3 of shift register 52 is again enabled while line G2 of shift register 56 remains enabled. As seen on line Q of FIG. 3, nine pulses 244, 246, 248, 250, 252, 254, 256, 258 and 260 are provided to decade counter 3 via gate 124. Gate 124 is enabled by the gate 100 connected to OC3 which is connected to leads E9 and GB2 via straps 174 and 176, respectively.

The lead E9 which is at a constant enabling level allows the passage of the full nine pulses to decade counter 3. Thus, when lead E9 is connected to a gate 100, the enabling of the gate is limited by the amount of time that the D leads are enabled.

It should also be noted in FIG. 3 that when pulse 260 is inserted in decade counter 3, the decade counter is stepped from a count of 9 to 0 thereby causing a carry pulse on line 138 to the input of decade counter 2 which is shown as pulse 262 on line P of FIG. 3.

After the eleventh cycle of the shift register 40, the two bits of the input register 22 are completely sampled and thus decade counters 1, 2 and 3 are provided with all the pulses that they are to receive and the count therein is thus equal to the decimal representation of the binary coded signal provided on lines B1 and B2. In the instant case, the count is 930 (251+679). The decimal display 74 receives the signals via lines 72 from the counters 102 to display the contents thereof. It should be noted that the shift register 40 continues to receive pulses from the clock pulse generator until such time as the shift register 56 is completely cycled. Control 28 terminates the operation of the clock pulse generator 34 after a predetermined period of time which is long enough to insure that the shift register 40 has cycled enough times to cause the complete cycle of shift register 56.

It should also be noted that the aforementioned example is given only by way of illustration to faciliate an understanding of the invention. It should be understood that the translator is adapted for a larger number of binary bits being utilized and thereby being entered via lines 24 to the input register 22. However, the example illustrates the manner in which the unit 44 is adaptable to translate any binary-coded signal into a decimal representation thereof.

It can therefore be seen that a new and improved digital translator has been provided. The translator is capable of translating any binary-coded signal irrespective of the code and the weight attributed to each bit by adapting the gating and decimal counting unit in accordance with the decimal significance of each bit of the code. Moreover, the unique combination of shift registers 40, 52 and 56 enables the generation of signals which can be utilized by a plurality of combinations of gating means to enable the translation of a plurality of binary signal codes to the decimal representation thereof.

A further feature of the invention is the conversion of the binary signals into a decimal representation thereof by a combination serial and parallel system. The shift registers 40 and 52 cause the decimal significance of each bit sampled by shift register 56 to be inserted into sequential stages of the decade counter. Accordingly, a very fast translation is accomplished without requiring the large amounts of circuitry necessary to provide a completely parallel operation.

It should be understood that while shift registers 40, 52 and 56 are utilized to provide the enabling clock signal which sequentially provides the pulses to the decade counters 102 (FIG. 2B), such timing means may be replaced by other well-known means such as counters and decoders. For example, shift register 40 may be replaced by a modulo 9 counter connected to a decoder comprised of a plurality of gates to provide signals similar to the signals provided on lines E1 through E8.

Without further elaboration, the foregoing will so fully illustrate my invention that others may, by applying current or future knowledge, readily adapt the same for use under various conditions of service.

What is claimed as the invention is:

1. A digital translator for converting a binary coded signal representative of a number into a decimal representation of said number, said translator including means for receiving said binary coded signal, a source of clock pulses, a replaceable unit having gating means comprised of a plurality of coincidence gates and counting means comprised of a plurality of decimal counter stages, each of said counter stages corresponding to a digit of said decimal number generated by said translator, said plurality of gates being divided into groups with each group being associated with a different one of said counter stages, said unit further including a plurality of conductive leads responsive to said binary signal and said clock pulses, said gates being connected to said conductive leads in accordance with the decimal significance of each bit of said binary code, a conductive lead being connected to each group of gates associated with said counter in accordance with the decimal value of each bit so that said gating means enable the passage of clock pulses in a sequence of groups to succeeding stages of said counter in accordance with the decimal significance of each bit of said binary signal which is present, said counter being stepped to the count corresponding to said number.

2. The digital translator of claim 1 wherein said source of clock pulses includes a clock pulse generator and a plurality of shift registers, said clock pulse generator being connected to the input of a first of said shift registers, and said second and succeeding shift registers being connected in tandem with said first shift register.

3. The digital translator of claim 2 wherein said first shift register includes a plurality of stages, each of which is associated with a particular binary bit of said binary coded signal, said second shift register including a plurality of stages, each of said stages being associated with the decimal digits of said decimal representation and said third shift register includes a plurality of stages which are each associated with the number of pulses insertable into different ones of said plurality of counters.

4. The digital translator of claim 3 wherein said third shift register is comprised of eight stages, each of said stages having an output line for enabling the passage of a different number of clock pulses to said plurality of counters.

5. The digital translator of claim 4 wherein said third shift register includes a means responsive to the last stage of said shift register when said last stage is in a first state so that the next clock pulse received by said shift register causes each of the stages in said shift register to be changed to the second state.

6. The digital translator of claim 3 wherein said second shift register is comprised of a plurality of stages equal in number to the number of counters provided in said replaceable unit, said second shift register adapted to recirculate the contents thereof so that a 1 provided in the shift register is circulated sequentially through the shift register stages.

7. The digital translator of claim 3 wherein said first shift register includes a plurality of stages equal in number to the bits of a binary-coded signal that s said means for receiving is capable of handling, said shift register being connected so that a 1 is circulated iteratively through said shift register as said shift register is shifted.

8. The digital translator of claim 1 wherein display means are provided which are responsive to said counters for displaying the contents thereof.

9. A digital translator for converting a binary-coded signal representative of a number into a modulo X representation of said number, said translator including means for receiving said binary-coded signal, a clock pulse generator, gating means, a plurality of modulo X counters, each of said counters corresponding to a digit of said modulo X number generated by said translator, a clock pulse generator, a first shift register connected to the output of said clock pulse generator having X-2 stages, a second shift register which is responsive to said first shift register to be shifted each time said first shift register has been shifted through a complete cycle, a third shift register responsive to said second shift register which is adapted to be shifted each time said second shift register has completely cycled, said second shift register including a plurality of stages equal in number to the number of counters and said third shift register including a plurality of stages equal in number to the maximum number of bits of said binary-coded signal, said gating means being responsive to the outputs of the stages of the three shift registers in accordance with the modulo X significance of each bit of said binary code so that said gating means enables the passage of clock pulses to said counter stages in accordance with the modulo X significance of each bit of said binary signal which is present, said counters each being stepped to the count corresponding to said number.

10. A digital translator for converting a binary-coded signal representative of a number into a modulo X representation of said number, said translator including means for receiving said binary-coded signal, means for sampling each bit of said binary-coded signal in sequential order, a plurality of modulo X counters, a plurality of gating means, each of which is associated with one of said counters, a source of clock pulses, means for enabling sequentially said counters to receive said clock pulses, said gating means enabling the passage of a predetermined number of clock pulses to each of said counters in accordance with the modulo X significance of said binary bit which is sampled, said means for sequentially enabling said counters being recycled for each bit of said binary-coded signal which is sampled so that said counters will be stepped to a count which is a modulo X representation of said number represented by said binary-coded signal.

* * * * *